United States Patent [19]

Howlett

[11] Patent Number: 5,056,451

[45] Date of Patent: Oct. 15, 1991

[54] RUDDER CONSTRUCTION WITH INTEGRAL STOCK

[76] Inventor: Ian C. Howlett, Chestnut Cottage, Beaulieu, Hampshire S042 7YB, England

[21] Appl. No.: 508,146

[22] Filed: Apr. 11, 1990

[30] Foreign Application Priority Data

Apr. 12, 1989 [GB] United Kingdom ............... 8908277

[51] Int. Cl.⁵ ............................................ B63H 25/06
[52] U.S. Cl. .................................... 114/162; 114/165
[58] Field of Search ...................... 114/162, 105, 140; 441/79; 244/124; 264/220, 226, 227; 446/30, 33, 230, 232, 160

[56] References Cited

U.S. PATENT DOCUMENTS 2,659,444 11/1953 Stanley ............................ 244/124
3,846,533 11/1974 Carrier ............................ 264/220

Primary Examiner—Ed Swinehart
Attorney, Agent, or Firm—Notaro & Michalos

[57] ABSTRACT

A method of constructing a rudder comprises the steps of producing two female moulds each having the shape of half the rudder and stock, moulding in each mould one half of the blade and stock portions (11, 12) of the rudder, removing the moulded halves from the female moulds, placing the two moulded halves in face contact with each other and then securing the two moulded halves together to form a rudder having integral stock and blade portions (11a, 12a).

9 Claims, 1 Drawing Sheet

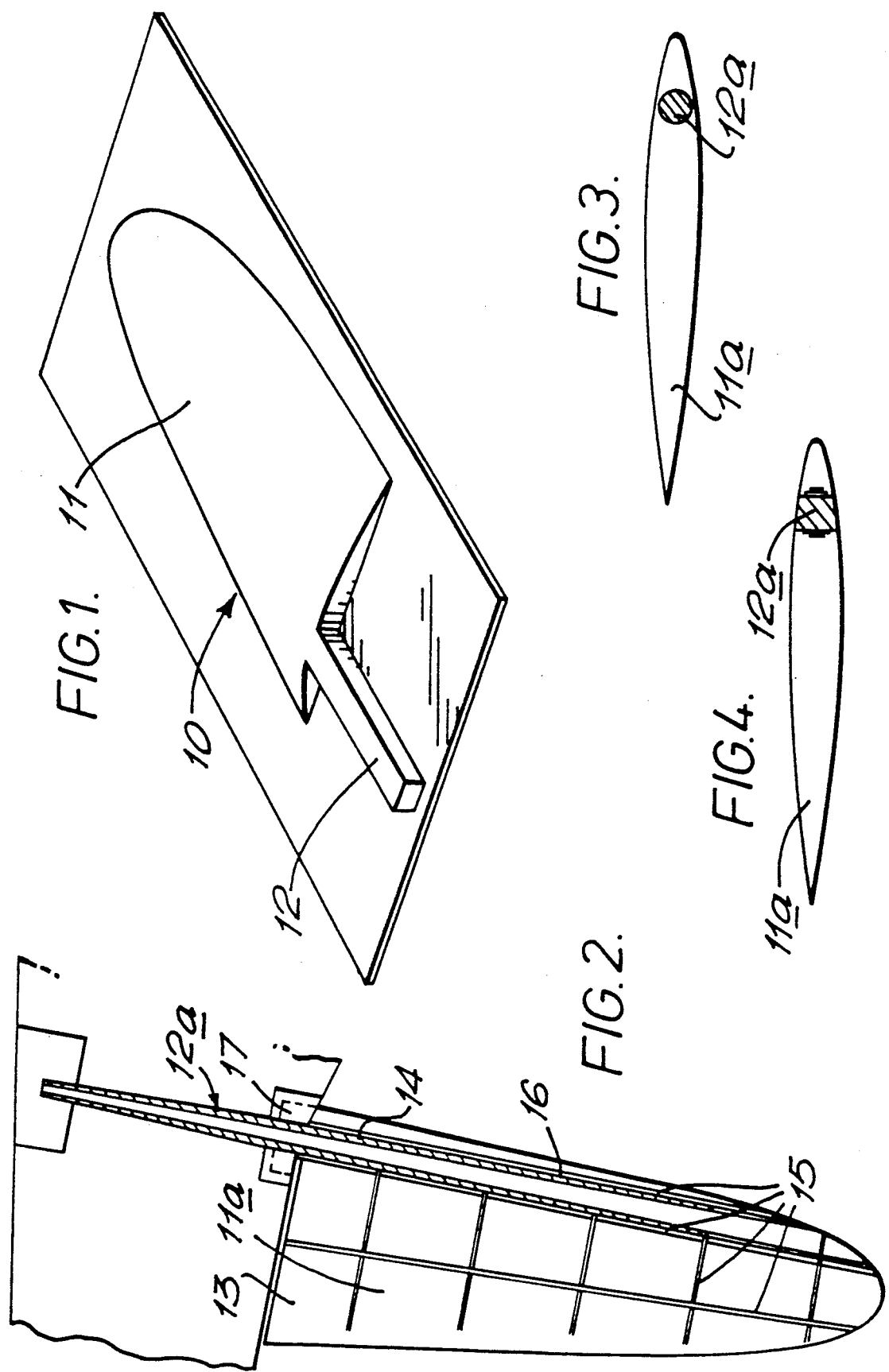

RUDDER CONSTRUCTION WITH INTEGRAL STOCK

FIELD AND BACKGROUND OF THE INVENTION

This invention relates to a method of constructing a rudder for use on water-borne craft, such as sailing craft, and to a rudder when constructed by the method of the invention. In particular the invention relates to an inboard mounted rudder.

It is known to mould the blade portion of a rudder and to secure the moulded blade portion to a separate stock. Such a construction requires multiple construction operations.

SUMMARY OF THE INVENTION

According to the present invention there is provided a method of constructing a rudder, comprising the steps of production two female moulds each having the shape of half of the rudder and stock, moulding in each mould one half of the blade portion and stock portion of the rudder, removing the moulded halves from the female moulds, placing the two moulded halves in face to face contact with each other and securing the two moulded halves together of form a rudder having integral stock and blade portions.

Perferably, the two female moulds are each formed by moulding the two moulds around a plug member shaped to the desired shape of the rudder blade and stock portions.

Preferably the halves of the rudder are moulded from a fibre reinforced plastics material. Each moulded half of the rudder may be provided with ribs on its side which is placed in contact with the other half of the rudder.

BRIEF DESCRIPTION OF THE DRAWINGS

An embodiment of the invention will now be described, by way of example, with reference to the accompanying drawings, in which:

FIG. 1 is a diagrammatic perspective view of a plug member used for forming the two female moulds, FIG. 2 is a plan view of one half of the moulded rudder, FIG. 3 is an end view of a moulded rudder having a circular section stock portion, and FIG. 4 is an end view of a moulded rudder having a rectangular section stock portion.

DESCRIPTION OF THE PREFERRED EMBODIMENT

Firstly a plug member 10 is formed from any suitable material, the plug member 10 having the desired shape of the rudder to be formed and it consists of a blade portion 11 and an integral stock portion 12. From this plug member 10 is produced two open sided female moulds each having the shape of half of the desired rudder. Into each open sided female mould is laid fibre reinforced plastics material 13 which forms the blade portion 11a of the rudder and fibre reinforced plastics material 14 which forms the stock portion 12a of the rudder.

The fibre reinforcing may be glass, carbon or aramid Kevlar (Registered Trade Mark) fibres and the plastics material can be any suitable resin or other plastics material. Ribs and spars 15 can be provided on the plastics material 13 so as to be on the side which is to be placed in contact with the other moulded half of the rudder.

The blade portion 11a preferably comprises a sandwich lay-up of p.v.c. and fibre reinforcing.

The sides of the stock portion 12a are formed in shuttering members 16 which have a top surface which can be used for bonding the two halves of the moulded rudder together. The moulded stock portion 12a can be hollow or it may be solid.

The stock portion 12a of the completed rudder may be circular in transverse section as shown in FIG. 3 or rectangular as shown in FIG. 4.

When the two moulded halves of the rudder have set or hardened they are removed from the respective female moulds and are placed in face to face contact with each other and bonded together to form a rudder having integral blade and stock portions. In addition to bonding the two moulded halves together a further lamination or laminations of reinforced plastics material can be placed across the bonding or joining lines.

It is also possible to provide the stock portion 12a with additional reinforcing rods or other reinforcing means.

Bearings and seals 17 are provided on the stock portion 12a.

As clearly shown in FIG. 2, the lay-up material forming the stock portion 12a extends substantially continuously and in an aligned fashion through most of the length of the blade 11a, and out through the top end of the blade to form the external stock portion.

I claim:

1. A method of constructing a rudder of a water-borne craft, comprising:
   forming two female moulds having open sides, each mould having the shape of one half the rudder, the shape of each half of the rudder including a blade portion and a stock portion;
   forming a rudder half in each female mould by the lay-up of material into each mould through the open side of each mould, to form the blade portion of each rudder half and the stock portion of each rudder half with the stock portion extending substantially continuously and in aligned fashion through most of the length of the blade portion and out through a top end of the blade portion to form an external part of the stock portion;
   removing each rudder half from each respective female mould through the open side of each respective female mould;
   placing the two mould halves in a face to face relationship and connecting the rudder halves to each other to form the rudder with integral blade and stock portions.

2. A method as claimed in claim 1, in which the two female moulds are each formed by moulding the two moulds around a plug member shaped to the shape of the rudder blade and stock portions.

3. A method as claimed in claim 1, in which the halves of the rudder are moulded from a fibre reinforced plastics material.

4. A method as claimed in claim 3, in which each rudder half is provided with ribs on its side which is placed in contact with the other rudder half.

5. A method as claimed in claim 1, in which the moulded stock portion is hollow.

6. A method as claimed in claim 1, in which the moulded stock portion is solid.

7. A method as claimed in claim 1, in which the stock portion is moulded to be of circular or rectangular cross-section.

8. A method as claimed in claim 1, in which additional reinforcing means are provided in the stock portion.

9. A rudder constructed by the method as claimed in claim 1.

* * * * *